United States Patent
Peratoner

(12) 
(10) Patent No.: US 6,570,492 B1
(45) Date of Patent: May 27, 2003

(54) ELECTRONIC RETAIL PRICE TAG SYSTEM

(76) Inventor: Sergio Peratoner, 8312 Somerset Ranch Rd., No. A, Paramount, CA (US) 90723

( * ) Notice: Subject to any disclaimer, the term of this patent is extended or adjusted under 35 U.S.C. 154(b) by 1200 days.

(21) Appl. No.: 08/827,835

(22) Filed: Apr. 11, 1997

Related U.S. Application Data

(63) Continuation of application No. 08/565,733, filed on Nov. 30, 1995, now abandoned.

(51) Int. Cl.[7] .................................................. H04Q 1/00
(52) U.S. Cl. ............................ 340/310.01; 340/310.08; 340/5.9; 40/447; 40/463
(58) Field of Search ....................... 340/825.54, 825.35, 340/10.34, 5.9, 310.01, 310.08; 364/404, 405, 403; 235/383; 40/447–448, 450, 463; 370/438

(56) References Cited

U.S. PATENT DOCUMENTS

| | | |
|---|---|---|
| 2,426,079 A | 8/1947 | Bliss |
| 4,002,886 A | 1/1977 | Sundlein |
| 4,500,880 A | 2/1985 | Gomersall et al. |
| 4,521,677 A | 6/1985 | Sarwin |
| 4,766,295 A | 8/1988 | Davis et al. |
| 4,888,709 A | 12/1989 | Revesz et al. |
| 4,962,466 A | 10/1990 | Revesz et al. |
| 5,019,811 A | 5/1991 | Olsson et al. |
| 5,111,196 A | 5/1992 | Hunt |
| 5,172,314 A | 12/1992 | Poland et al. |
| 5,198,644 A | 3/1993 | Pfeiffer et al. |
| 5,241,467 A | 8/1993 | Failing et al. |
| 5,245,534 A | 9/1993 | Waterhouse et al. |
| 5,299,117 A | 3/1994 | Farnbach |
| 5,313,569 A | 5/1994 | Olsson et al. |
| 5,315,775 A | 5/1994 | Parker et al. |
| 5,348,485 A | 9/1994 | Briechle et al. |
| 5,374,815 A | 12/1994 | Waterhouse et al. |
| 5,401,947 A | 3/1995 | Poland |
| 5,404,149 A | 4/1995 | Joliey |
| 5,453,737 A * | 9/1995 | Opoczynski ................ 370/438 |

OTHER PUBLICATIONS

Data Communications, Networks, and Systems, pp. 180, 181,216–218, 1991.*

* cited by examiner

*Primary Examiner*—Brian Zimmerman
(74) *Attorney, Agent, or Firm*—Morland C. Fischer

(57) ABSTRACT

A distributed electronic price display system includes a central computer communicating through a radio frequency system to receivers located preferably at a gondola unit between each aisle in a facility to display prices or other information. Each gondola unit may be controlled by a single controller, depending upon the size and number of shelves and number of electronic tags placed under the command of the single controller. Each level of control at the gondola redistributes information to the next level down by selectively enabling the receipt and re-transmission of the information at various routing points in the system, including master controllers, slave controllers and price tag modules. This process continues until the message is loaded into the electronic display. A change of price can be accomplished remotely from the central station by the use of a radio frequency terminal carried by an attendant. In addition, polling from the central computer is enabled to independently determine the price stored in each electronic tag.

20 Claims, 13 Drawing Sheets

ELECTRONIC RETAIL PRICE TAG SYSTEM

This application is a continuation of application Ser. No. 08/565,733, filed Nov. 30, 1995, now abandoned.

FIELD OF THE INVENTION

The present invention relates to the field of improved retail electronic pricing systems. More specifically, the present invention relates to an economically advantageous price display system which has efficient price entry and price verification while eliminating the need for the costly use of expanded address and expanded distribution of sophisticated electronics and at the same time facilitating shelf and product configuration changes through modular design.

BACKGROUND OF THE INVENTION

Retail stores which use shelving displays have typically shown a paper or plastic price tag at the edge of the shelf and which has been interchanged manually when the goods have been replaced with different goods, or where the display areas of a particular type of goods is expanded or reduced. Where the tags bear the price of the goods, the tags have been changed whenever the price changes. Of course, a manual system will tend to be more labor intensive and prone to error. When the time spent system which simultaneously transmits the information signal to all price tag addresses is not treated.

U.S. Pat. No. 5,245,534 to Waterhouse et al., entitled "Electronic Tag Location Systems" deals in part with the cost of hardware located between the central controller and the individual price displays. The Waterhouse et al. invention uses a series of switches. to deny system access between a signal source and certain tag displays and also between tag displays and other groups of tag displays. The bus layout is that of an abbreviated bus where logical switches operate to complete conductive contact of abbreviated bus portions downstream of the switches. Further burdening the system of Waterhouse et al., each switch has its own unique address. Further, the device of Waterhouse et al. includes a duplicated system of identifiers which are used to poll the individual tag locations to determine if the message received by the tag is correct.

One example of the physical layout of an electronic price display system is found in U.S. Pat. No. 5,348,485 issued to Briechle et al., and entitled "Electronic Price Display System with Vertical Rail." The Briechle et al. system discloses a shelving unit, known as a gondola, having a vertically extending electrical connector. The vertically extending electrical connector is physically connected to each electronic display tag located at the outer edge of the shelf. The physical connection of each shelf to a vertical support takes place on the outermost sides of the back edge of each shelf. The hard wire nature of the overall system makes the Briechle et al. system costly and cumbersome, as well as impractical to implement and maintain. Interconnects between the shelf and vertical bus are accomplished manually requiring the user to physically attach a connector to the vertical rail. The system of the present invention accomplishes the connection somewhat automatically during the installation of a shelf to a gondola.

In all of the above examples, no design has been set forth which allows the requisite simplicity and economy to gain wide acceptance in the retail industry. What is needed is an electronic price display system which is of an economic design to permit its widespread acceptance and use. The needed system should provide flexibility and advantages which have been previously associated only with a more expensive system.

SUMMARY OF THE INVENTION

A modularized distributed electronic price display system includes a central computer communicating through hard wired or a radio frequency system to receivers located at each aisle. Each receiver at each aisle is wired into each of a series of gondola units. Each gondola unit may be controlled by a single controller or multiple controllers, depending upon the size and number of shelves and number of electronic tags placed under the command of the single controller.

Each level of control beyond the radio frequency receivers at each aisle redistributes information to the next level down by selectively enabling the receipt of the information at each subsequent level of distribution. Each unit connected to the transmitting unit has the message is transmitted to it, but only a unit which is enabled to receive the message into its memory register will actually logically have access to the message. This process continues until the message is loaded into the electronic display. This system eliminates the wiring and hardware at the display which would otherwise be necessary in sending an informational signal to each price tag unit for logical address verification.

Due to extensive modularization in the design, a change in shelving configuration and control distribution can be easily implemented. Once the configuration of the shelving has been changed, if necessary, a change of price can be accomplished at the central station, or remotely from the central station by the use of a radio frequency terminal carried by an attendant. Since a price change will appear instantly within the view of an attendant, proper system operation is assured. In addition, polling from the central computer is enabled to independently determine the price stored in each electronic tag.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The description and operation of the invention will be best described with reference to FIG. 1, a system diagram which indicates four levels of control. The top of the control hierarchy is a central computer processing unit, or central CPU 31. CPU 31 can be any type of computer such as a microprocessor, but will likely be a personal computer. CPU 31 will have a driver program which will facilitate program execution and other tasks relating to pricing. The CPU 31 will have the capability to store and sort large numbers of files relating to product identification, product price, and preferably bar coded representations of the product identity, to enable attendants to more rapidly enter the information into the central CPU 31.

In the present invention, bar coding is the preferable means of product identification since it can facilitate several of the capabilities of the invention. Further, since the invention was formulated with ease of installation in mind, the CPU 31 is shown connected to a radio link transceiver 33. Transceiver 33 is shown with an antenna 35. One of the reasons for the use of the radio link transceiver 33 is the elimination of the necessity to string wires or cable from one set of several lengths of shelving to another set of lengths of shelving. As an example, it would help eliminate the necessity to run wiring between aisles in a retail store. In a grocery store the aisles are defined by one continuous length of shelving which are known as gondolas. The customers can walk between and around the gondolas, since the gondolas actually defines the location and width of the aisles.

Since store shelving does not normally use a continuous supply of electricity, most existing shelving does not have any power supply or cabling structures present. The system of the invention includes an information distribution system which carries its own power. In newer installations a series of conduit spaces may be made available to facilitate a network of wires connecting each one of the continuous lengths of shelving which form the basic shelving unit in a store. To facilitate the retrofit of the device of the present invention, it is being shown with a radio link transceiver 33. Each continuous length of gondolas will ideally have a complementary radio link transceiver 37 as shown in FIG. 1. Ratio link transceiver 37 has an antenna 39 of similar construction to the antenna 35. Communication will preferably be carried out digitally.

Figure 1:
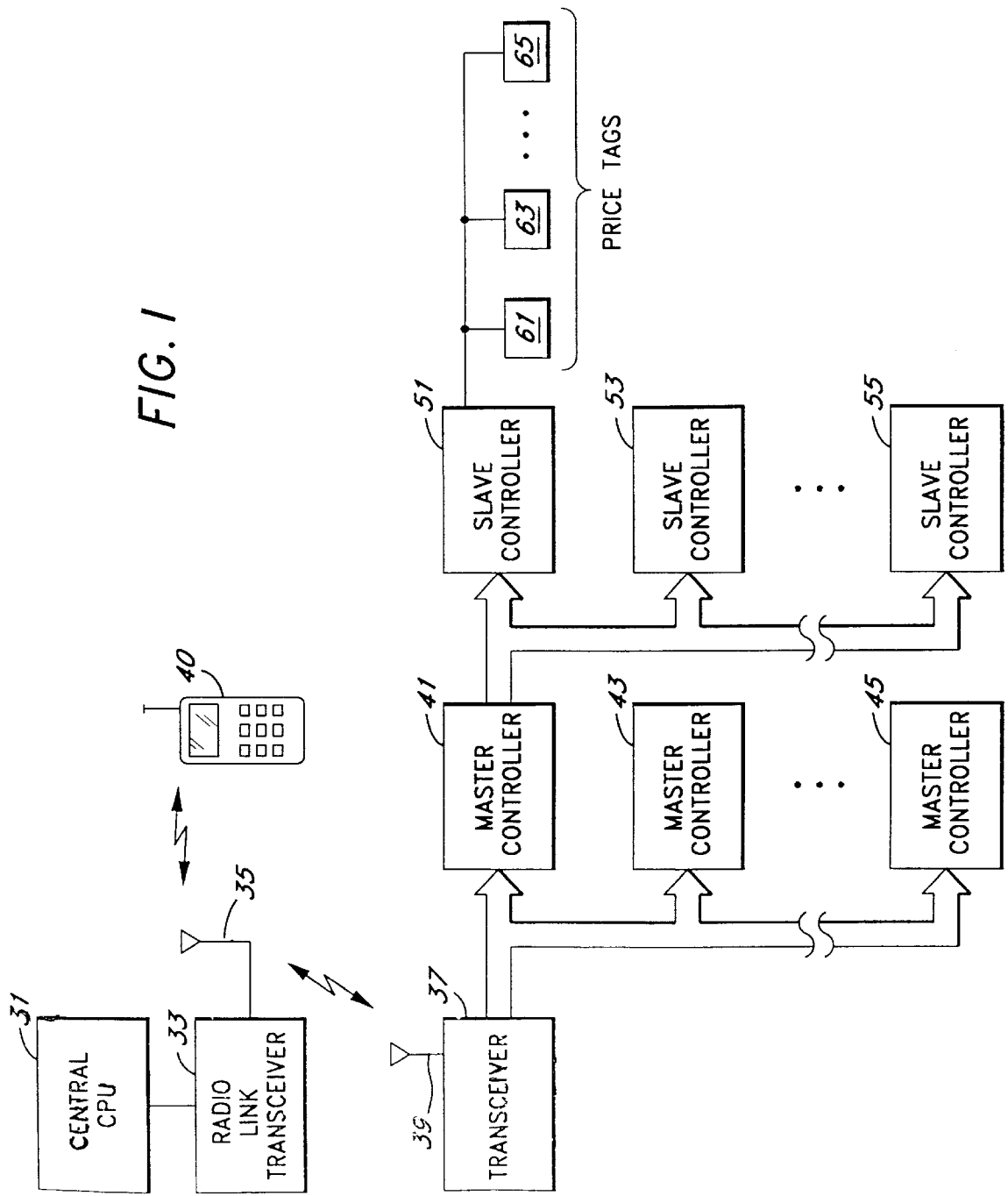
FIG. 1 is an overall simplified schematic of one possible embodiment of the electronic price tag system of the present invention.

Also shown in FIG. 1 is a hand-held transmitter or transceiver unit 40 which may have an input keyboard and display, and preferably a bar code scanning device. Hand-held unit 40 may be configured to communicate with radio link transceiver 33, or some other radio link transceiver in communication with central CPU 31. In a minimal system, it is not necessary for the hand-held unit 40 to receive information, and therefore it may simply be a transmitter. The effect of a transmission will normally appear on a price tag, and thus the communication loop is a complete one.

Various communication protocols are available to enable communication through a single radio link transceiver 33. The hand-held unit 40 enables an ordering/inventory employee to communicate with the electronic price tag system of the present invention while standing directly in front of an electronic price tag to be controlled. The handheld unit 40 will provide maximum flexibility and complete accuracy in determining whether particular piece of pricing data has been sent to the proper electronic price tag.

Transceiver 37 is connected to a master controller 41. As is shown, the transceiver 37 may be connected by wire to other master controllers 43 and 45. In the alternative, a series of transceivers 37 could be located at each continuous length of shelving and have associated with it a single master controller 41. Master controller 41 is the first level of information signal routing, since the first routing decision is made by the master controller 41 under the assumption that all master controllers will receive a pricing information signal simultaneously. Although several master controllers 41 are shown connected to a single transceiver 37, it is intended that all of the master controllers 45 are enabled to receive the information signal from the transceiver. Where each master controller 41 has its own transceiver 37, each transceiver would receive the information signal and it would thus still be available to each of the master controllers 43.

Whether several master controllers 41, 43, 45 are connected to a single transceiver 37 or whether each master controller 41, 43, 45 has its own transceiver 37 will depend upon the configuration and logistical demands of the location.

Master controller 41 is shown as being connected to a series of slave controllers 51, 53, 55. The slave controller 51, is shown connected to a series of price tag modules 61, 63, and 65. The system shown can be used with multiple numbers of price tag modules 61 per slave controller 51. Multiple numbers of slave controllers 51 can be used with each master controller 41. Any number of Master controllers can be used with a single transceiver 37.

The connections in FIG. 1 are shown as both a single line and as a relatively wide bus-like connector. In each instance multiple conductors are used. The numbers of conductors required will depend upon the overall system configuration.

In the preferred embodiment, and in a retail establishment where lengths of gondolas define aisles, each aisle will have its own master controller 41. Each shelving section will have one or more slave controllers. Of course, the density of slave controllers per section will depend upon the product density and resulting price tag module 61 density required to support the product. The overall distribution of wiring is deliberately configured to include a lesser number of conductors extending to the price tags 61, 63, 65 etc. in order to provide for a more cost efficient system.

Figure 2:
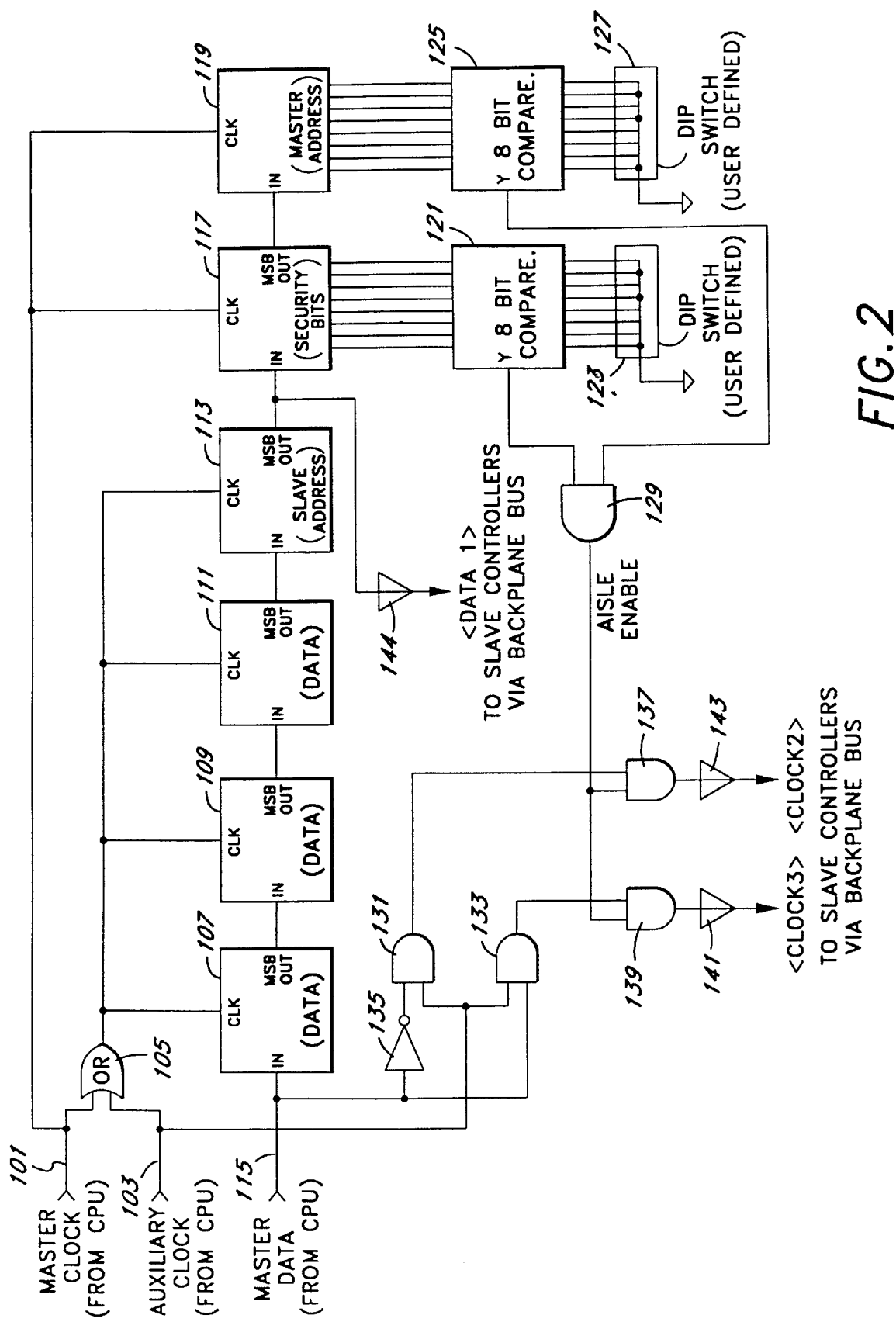
FIG. 2 is a detailed schematic of the master controller shown in FIG. 1.

Referring to FIG. 2, the master controller schematic is shown. The master controller is controlled by a master clock to receive its information. Other circuitry necessary to provide the clocked logic signals from the transceiver 37 will not be included herein, both for clarity and simplicity of explanation. The circuitry to provide these signals are commonly employed in pager units and in standardized bar coding systems which use digital encoding signals. At the upper left side of the schematic a master clock line 101 will accept a master clock input from the CPU 31. Just below master clock line 101 is an auxiliary clock line 103 which accepts an auxiliary clock signal from the CPU 31.

Lines 101 and 103 are connected into an OR gate 105. The output of the OR gate 105 is connected to the clock or CLK inputs of a series of four data chips 107, 109, 111, and 113. A master data input line 115 is connected into a data input of data chip 107. The data output of data chip 107 is connected to the data input of data chip 109. The data output of data chip 109 is connected to the data input of data chip 111. The data output of data chip 111 is connected to the data input of data chip 113.

The data output of data chip 113 is connected to the input of a data chip 117 which serves as a security register. The data output of data chip 113 is also made available to the slave controllers 51 associated with a particular master controller 41. This data output is labeled DATA 1. The data output of data chip 117 is connected to the data input of data chip 119. Data chip 119 serves as a master address register.

Eight conductors connect the data chip 117 to a bit compare chip 121. Another eight conductors connect the bit compare chip 121 to a dual in line package or DIP switch 123. The dip switch 123 has a user defined configuration. In a parallel fashion, eight conductors connect the data chip 119 to a bit compare chip 125. Another eight conductors connect the bit compare chip 125 to a dual in line package or DIP switch 127. The dip switch 127 also has a user defined configuration.

The outputs from the bit compare chips 121 and 125 connect into an AND gate 129 which is connected as an aisle enable component. When both the compare chips 121 (for comparing the security bits) and compare chips 125 (for comparing the master address transmitted) indicate that a comparison has occurred, the output of the AND gate 129 goes high.

Connected to the auxiliary clock 103 are the inputs for a pair of AND gates 131 and 133. The other input of AND gate 131 is connected to the output of an inverting gate 135. The other input of AND gate 133, and the input of the inverting gate 135 is connected to the master data input 115.

The output of AND gate 131 is connected to one input of an AND gate 137, while the output of AND gate 133 is connected to one input of an AND gate 139. The other inputs of AND gates 137 and 139 are connected to the output of AND gate 129. The outputs of the AND gates 137 and 139 are each connected to a respective line driver 141 and 143. The line drivers 141 and 143 add power and amplitude to the signals to overcome signal degradation due to the length of travel the signal must make over a conductor.

The use of line drivers 141 and 143, as well as any other line drivers described herein will be dependent on the size of conductors used, as well as the length of travel over which the signal must pass. Where attenuation is not a problem, line drivers will not be necessary. The DATA 1 output of shift register 113 is also shown as connected to a line driver 144. Where a line driver 144 is used, the output of the line driver will be directed to the slave controller 51.

The output from line driver 141 forms a clock 3 signal, while the output from line driver 143 forms a clock 2 signal. As can be seen from the logic of FIG. 2, when master data input 115 is receiving data, the AND gate 131 will be shut off, as will the clock 2 output signal from line driver 143. Likewise, only the presence of data on the master data input will enable the clock 3 signal to be triggered. In addition, for either the clock 2 or clock 3 signals to be triggered, both a positive security compare signal from compare chip 121 and a positive master address compare from chip 125 must be present.

Figure 3:
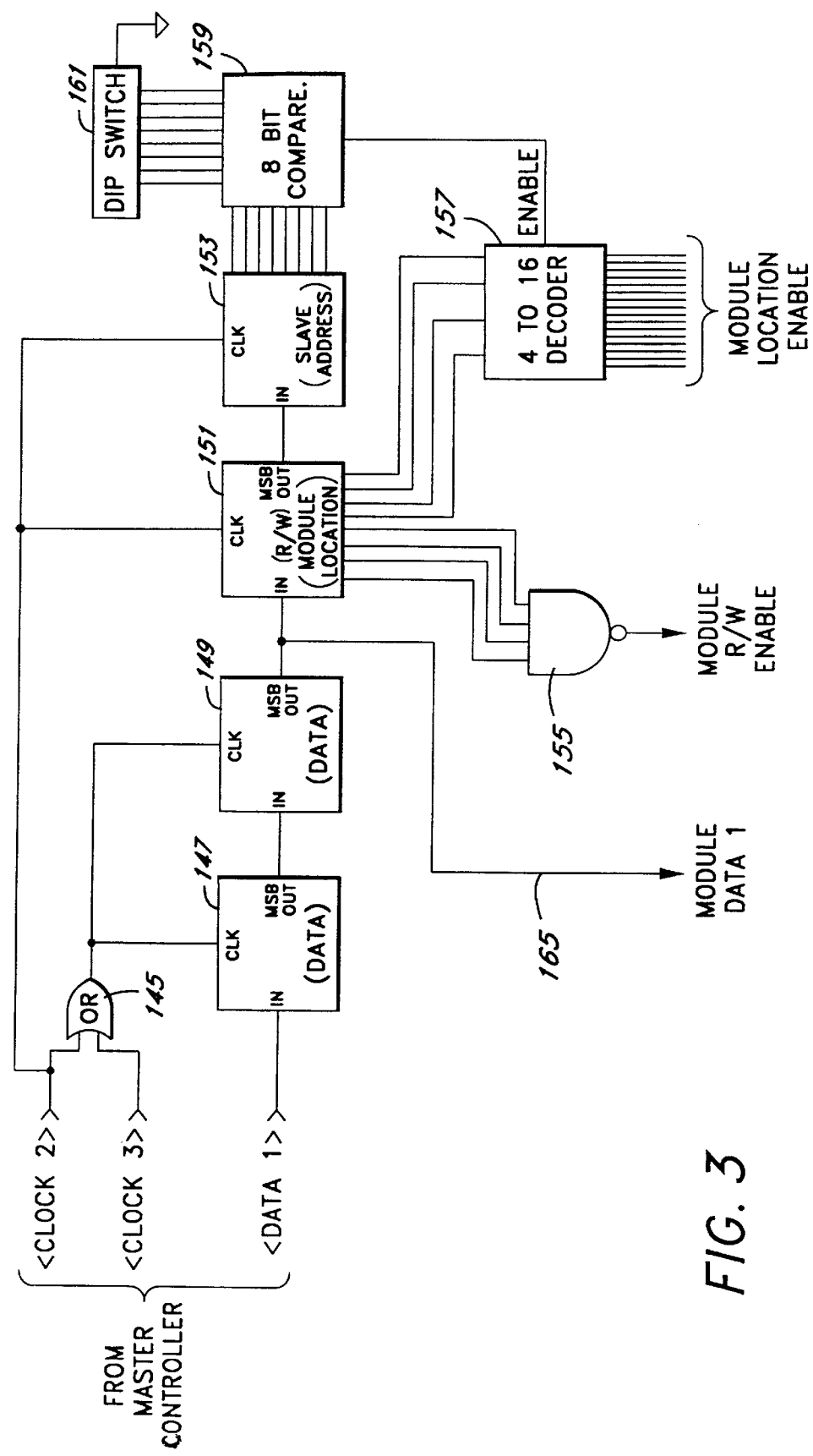
FIG. 3 is a detailed schematic of the slave controller shown in FIG. 1.

Referring to FIG. 3, a slave controller schematic is shown. At the upper left portion of the schematic the clock 2 and clock 3 signals are shown connected to the inputs of an OR gate 145. The output of the OR gate 145 is connected into the clock input of a shift register 147 and into the clock input of a shift register 149. The clock 2 signal is made directly available into the clock input of a shift register 151 and into the clock input of a shift register 153.

The logical output of the shift register 151 consists of eight lines. The first four lines are connected to the inputs of a four-input NAND gate 155. The output of the NAND gate 155 forms the module read/write enable signal. The other four lines from the shift register 151 are connected into a four-to-sixteen decoder 157. The four-to-sixteen decoder has an enable input. The output of the four-to-sixteen decoder 157 forms the module location enable output. Each one of the sixteen wires of the sixteen wire output of the four-to-sixteen decoder 157 extends to a single price tag module 61. Since four bits of information can represent sixteen logical states, the sixteen output lines of the decoder 157 can be individually enabled to control sixteen price tag modules 61. More decoding bits could be used to decode a larger group of price tags.

In essence, a portion of the system of the present invention is "address-less" in not being required to have address discrimination circuitry at the lowest level in the system. Pursuant to this goal, the decoding for price tag selection is accomplished by the slaves are controller 51. A price tag module 61 has no built-in or programmed address. All price tag modules 61 are equivalent to each other on stand-alone basis. The slave controller 51 decides which price tag module 61, 63 . . . . 65 will receive information by enabling only one particular module 61, 63, . . . 65. In this manner, the price tags will never need to have an individual address programmed into it. Eliminating the need to program at the price tag level distinguishes the present invention, since individual programming would create error in the price tag system even to the point of loss of communication with the price tag, if such a programmed individual price tag were to be moved.

The logical data output of the shift register 153 also consists of eight lines which are connected to the input of an eight bit compare chip 159. The eight bit compare chip 159 has another eight inputs connected from a DIP switch 161. Eight bit compare chip 159 has an enable output connected to an enable input of four to sixteen decoder 157.

The incoming DATA 1 signal from FIG. 2, by connection to the line driver 144 or by direct connection to the shift register 113 where no line driver 144 is necessary, is fed into the shift register 147. The data output of shift register 147 is connected to the data input of shift register 149. The data output of shift register 149 is connected to the data input of shift register 151, and also forms the module data line 165 which is connected to the price tag module 61. The data output of shift register 151 is connected to the data input of shift register 153. Additional shift registers may be added between the shift registers 147 and 149 to accommodate variations in the product display data.

Figure 4:
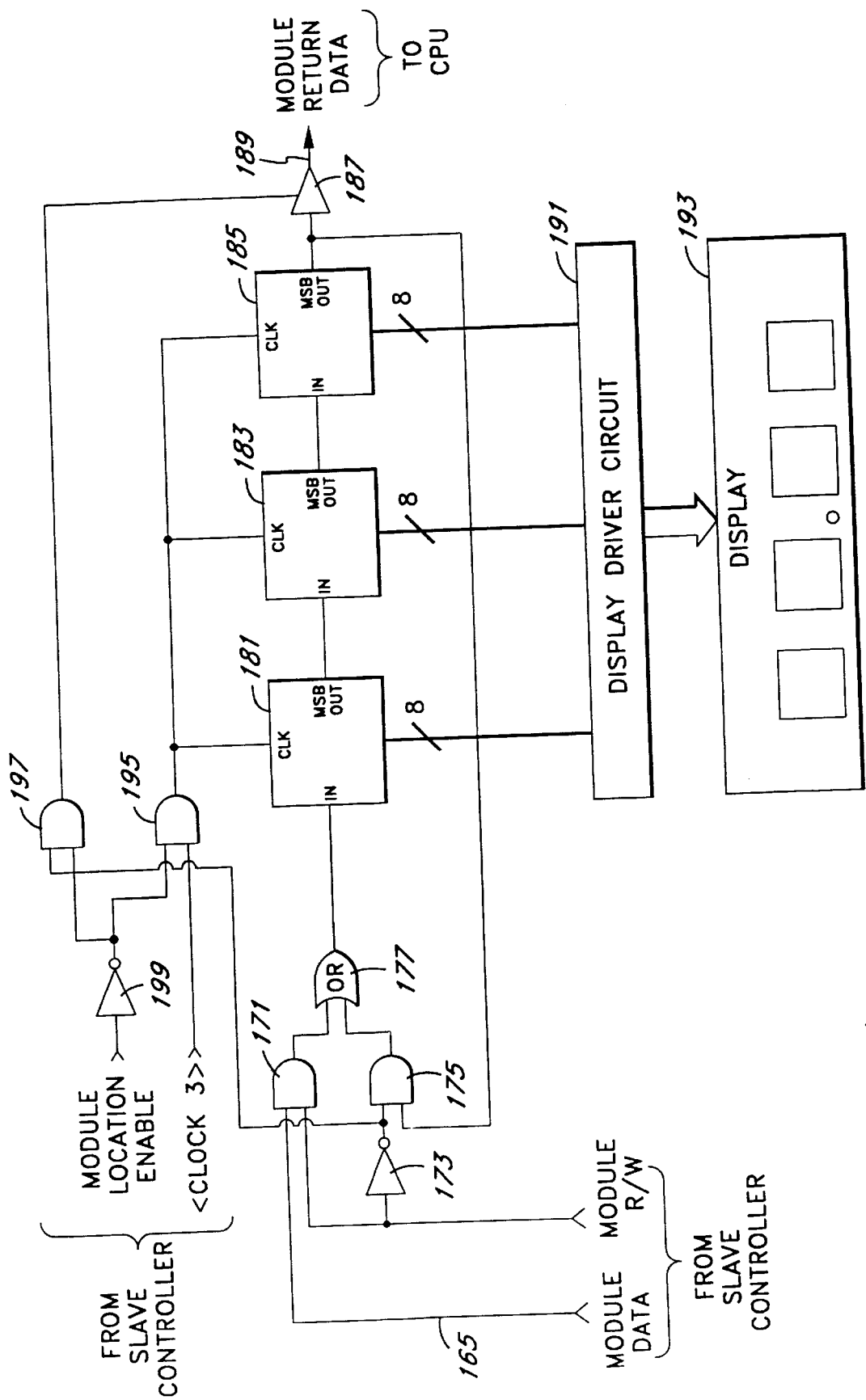
FIG. 4 is a detailed schematic of the price tag module shown in FIG. 1.

Referring to FIG. 4, the circuitry for the price tag 61 module is shown. A module data input 165 shown in FIG. 4 is connected to one of two inputs to an AND gate 171. The other input of the AND gate 171 is connected to the module read/write output from the output of NAND gate 155 shown in FIG. 3.

The read/write output from the output of NAND gate 155 is also made available to an inverter 173. The output of the inverter 173 is made available to one of two inputs of an AND gate 175 and also to one of two inputs of an AND gate 197. The output of the AND gate 171 and the output of the AND gate 175 are connected to the inputs of an OR gate 177. The output of the OR gate 177 is connected into the input of a shift register 181. The output of shift register 181 is connected to the input of shift register 183. The output of shift register 183 is connected to the input of a shift register 185. The output of shift register 185 is also connected into the input of a line driver 187 and through the line driver 187 to a line shown as module return data 189. Line driver 187 may optionally be any device which, when not activated, isolates the output of shift register 185 from any signal which may appear on the return module data line 189.

Each of the shift registers 181, 183, and 185 also have eight bit outputs. Each eight bit output of each of the shift registers 181, 183 and 185 is connected into a display driver circuit 191. The display driver circuit 191 is connected to and drives a display 193. As is shown, display 193 is enabled to show two digits of display of dollars and two digits of display representing fractions of a dollar, or cents. The circuit shown in FIG. 3 may be partitioned in different ways depending on selection of the appropriate integrated circuits. Variations to this design may include additional digits to display other information such as unit cost or (¢/oz, ¥/Kg, £/bushel, etc).

At the upper left side of the diagram of FIG. 4, the module location enable signal from a single output line of the four to sixteen decoder 157 is (from FIG. 3) introduced into the input of an inverter gate 199. The output of 199 is one of two inputs of an AND gate 195 and into one of two inputs of an AND gate 197. The clock 3 output from the line driver 141 of the master controller 41 is connected to the input of an AND gate 195. The output of the AND gate 195 is connected into the clock inputs of the shift registers 181, 183, and 185.

The other input of two input AND gate 197 is connected to the output of inverter gate 173. The output of the AND gate 197 enables the line driver 187 to operate. Operation of line driver 187 enables data to be returned over the module return data line 189. Once the price tag 41 module is enabled and once data appears at the output of shift register 185, the line driver 187 enables data to be sent over the module return data line 189.

Once the individual price tag module 61 is enabled from the four to sixteen decoder 157, the CLOCK 3 signals appear at the inputs of the shift registers 181, 183 and 185.

Data from line 165, when the module read/write line is high, can now be introduced into the shift registers 181, 183 and 185 in serial fashion. The data travels from one shift register to the next, until all three shift registers 181, 183 and 185 contain the three portions of the data to be properly passed to the display driver circuit.

The module return data line 189 is made available to the CPU 31 either directly or through the radio link represented by transceivers 37 and 33. Return data line 189 enables the CPU 31 to obtain a readout of the information contained in the shift registers 181, 183, and 185. At the same time that this information is being clocked out to the line driver 187, it is being re-introduced sequentially back into itself through the return line connected between the output of shift register 185 and one of the two inputs of two input AND gate 175.

In order for this to occur, the module read/write line from NAND gate 157 has to be low, making the output of inverter 173 high.

Both the physical and logical configuration of the system of the present invention provides for a narrowing of the numbers of wires and logical bits as the system nears proximity to the price tag modules 61. For example, it is expected that to perform a price loading operation at a single price tag module 61 a 48 clock pulse signal will be sent from the CPU 31 to the master controller 41. The resulting signal sent from the master controller 41 to the slave controller 51 will consist of 32 clock pulses. The signal which results from the slave controller 51 to the price tag module 61 61 will consist of 24 clock pulses.

This logically and properly corresponds to the 8 bits for each of the shift registers 181, 183, and 185 shown in FIG. 4. Referring to FIGS. 5, 6, 7, and 8, the timing diagrams for each communications link portion of the system of the present invention are shown. Each Figure shows the states of each of the communications links. The first set shows the date and clock states received at the master controller 41 from the CPU 31. The second set of timing information is the state of the back plane bus which carries information between the master controller 41 and the slave controller 51, and including data, clock 2, and clock 3 signals. The third set of timing information is the output of the slave controller 51, and includes module data, module read/write (R/W), and module enable signals. The fourth set of timing information is the output of the price tag module 61 on the module return data line 189 of FIG. 4, which is also physically located on the back plane bus between the slave controller 51 and the individual price tag modules 61, as well as between the slave controller 51 and the master controller 41.

Figure 5:
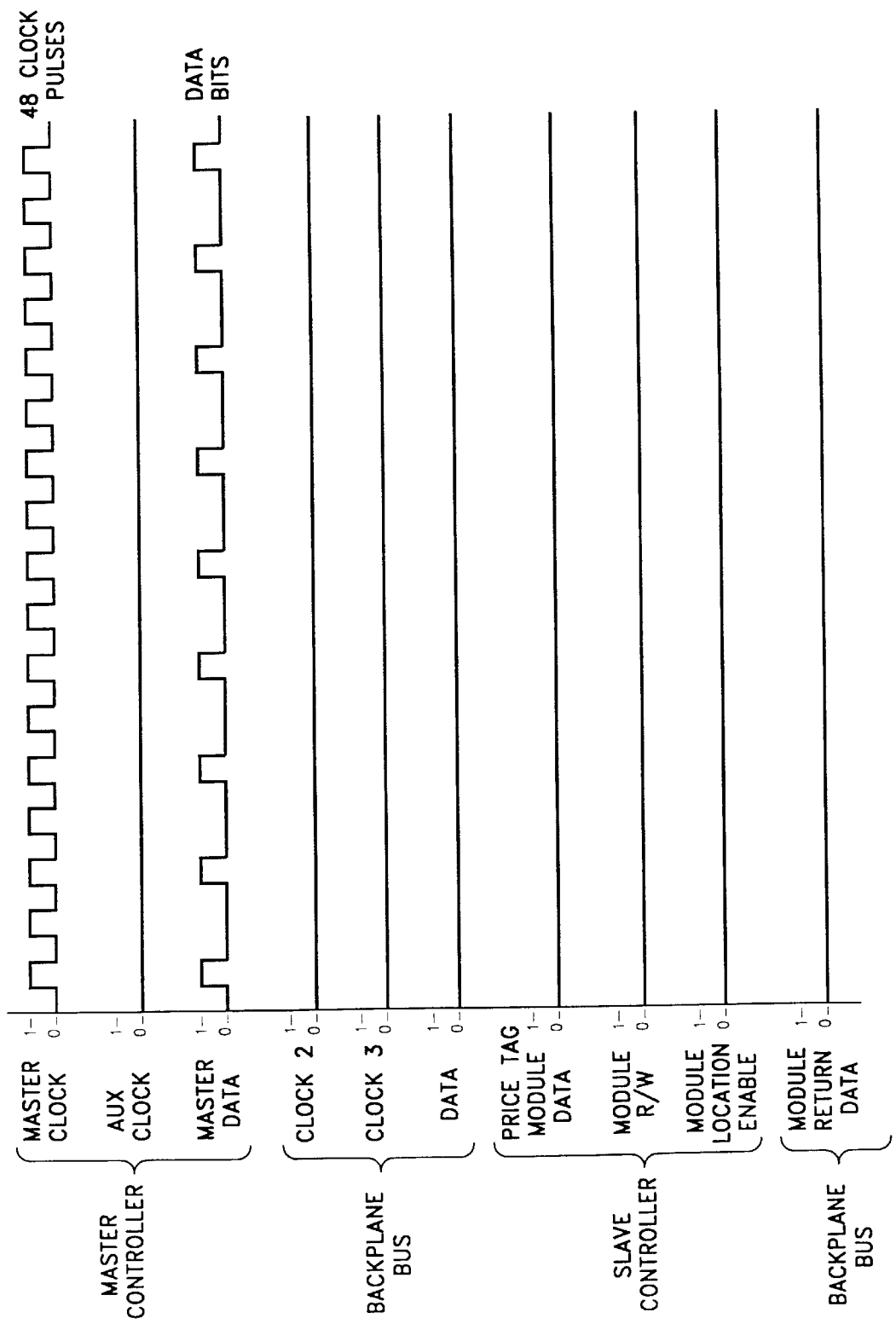
FIG. 5 is a signal timing diagram including connections relating to the master controller, back plane bus, and slave controller when data is received in the master controller.

As can be seen in FIG. 5, 48 clock pulses are sent out by the master clock at the same time as the master data is sent. The auxiliary clock input 103 remains at a low state throughout the time that the 48 pulses are received at the master controller 41. Note that the other connections associated with the back plane bus and, slave controller 51 are idle.

Figure 6:
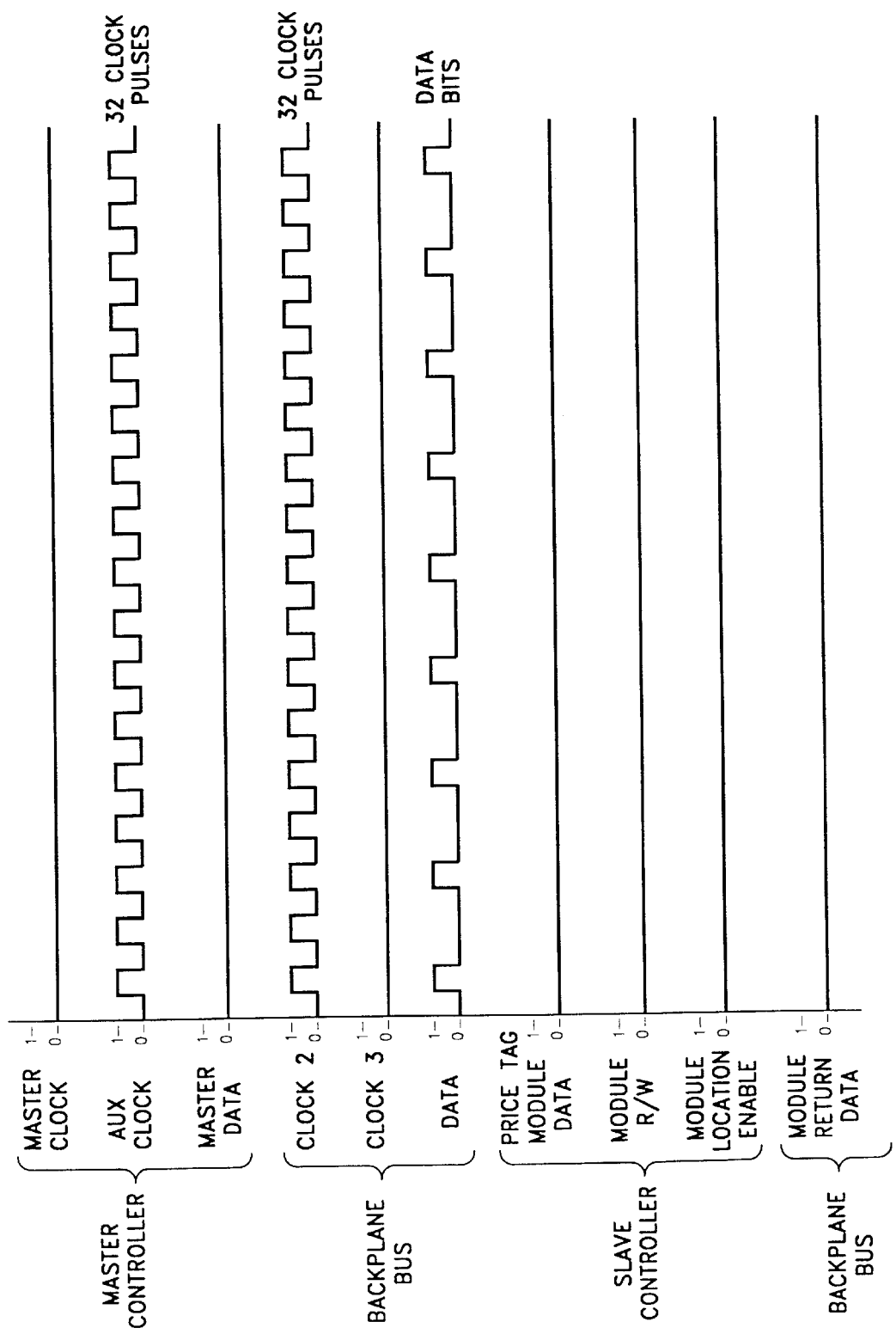
FIG. 6 is a signal timing diagram including connections relating to the master controller, back plane bus, and slave controller when data is received in the slave controller.

FIG. 6 illustrates the data transfer from the master S controller 41 to the slave controller 51. As can be seen, a 32 clock pulse auxiliary clock signal is sent from the master controller 41 as a clock 2 signal. Note that the master clock signal, which would originate from the CPU 31, is idle. The data signal line for DATA 1 also shows activity since data is being passed from the master controller 41 to the slave controller 51. The DATA 1 signal has a timing sequence driven by the clock 2 pulse. Note that the clock 2 pulse is derived from and driven by the auxiliary clock signal from the master controller. Note that the other connections associated with the slave controller 51 and module return data portion of the back plane bus are idle. In particular, note that the clock 3 and price tag module data signal lines are idle. It is clear that the master controller sends and controls the number of clock pulses which are output as an auxiliary clock signal, and which is used to clock data to the slave controller 51.

Figure 7:
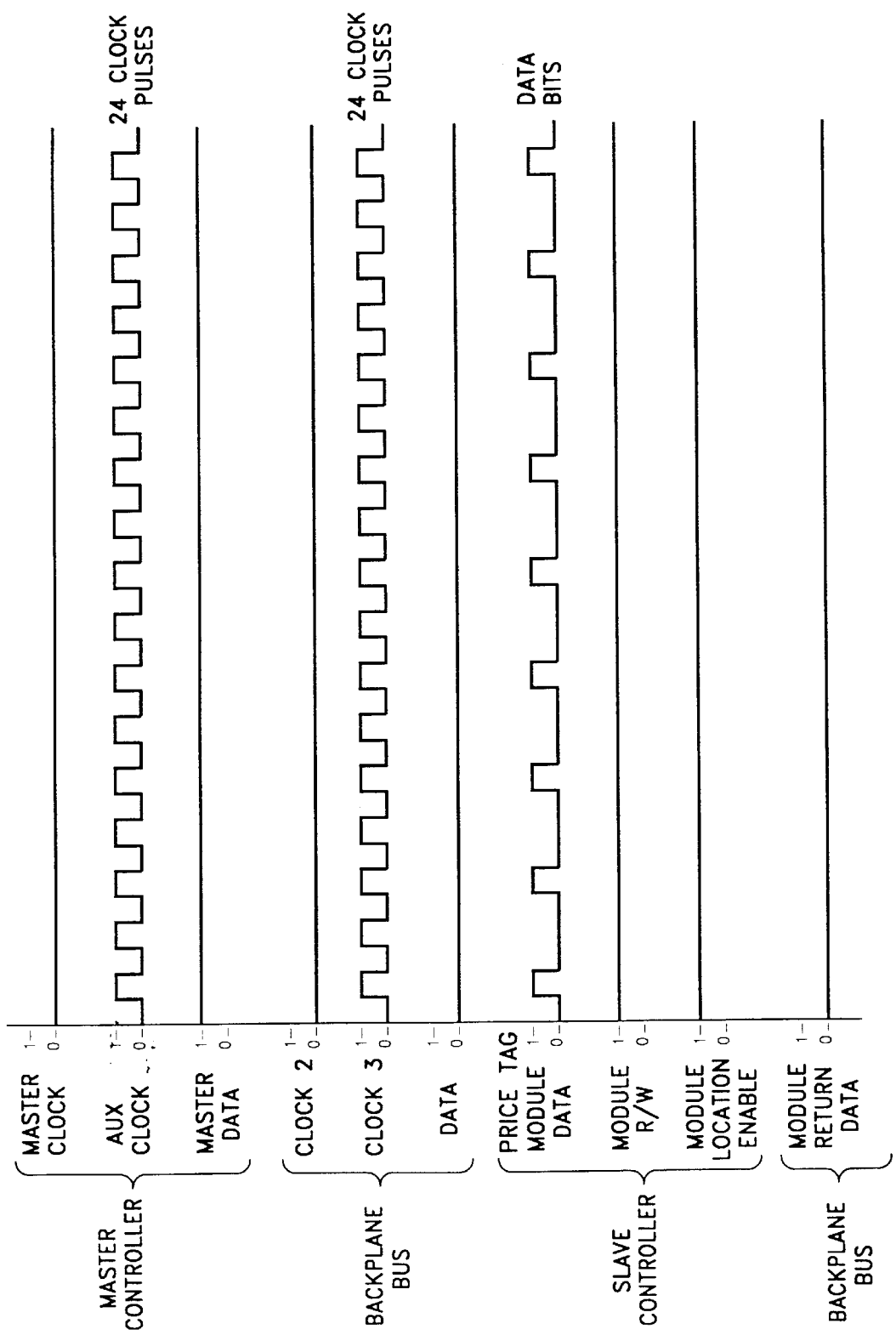
FIG. 7 is a signal timing diagram including connections relating to the master controller, back plane bus, and slave controller when data is received in the price tag module.

Referring to FIG. 7, both the auxiliary clock and clock 3 signal lines are active. In this case, it is the price tag module data signal line which is active. Note also that the module location enable line has gone from a "low" to a "high" state. This is the line from FIG. 4 which is connected to the AND gate 195 and which enables an individual price tag module 61 to accept data.

Also, the module read/write line has assumed a "high" state. This enables AND gate 171 to turn on, and insures that the AND gate 175 is turned off, as can be seen in FIG. 4. Logically this operates to allow a loading in of the data to the price tag module 61. It also insures that the mechanism for simultaneously retrieving and re-loading the data into the price tag module 61 will be disenabled.

Figure 8:
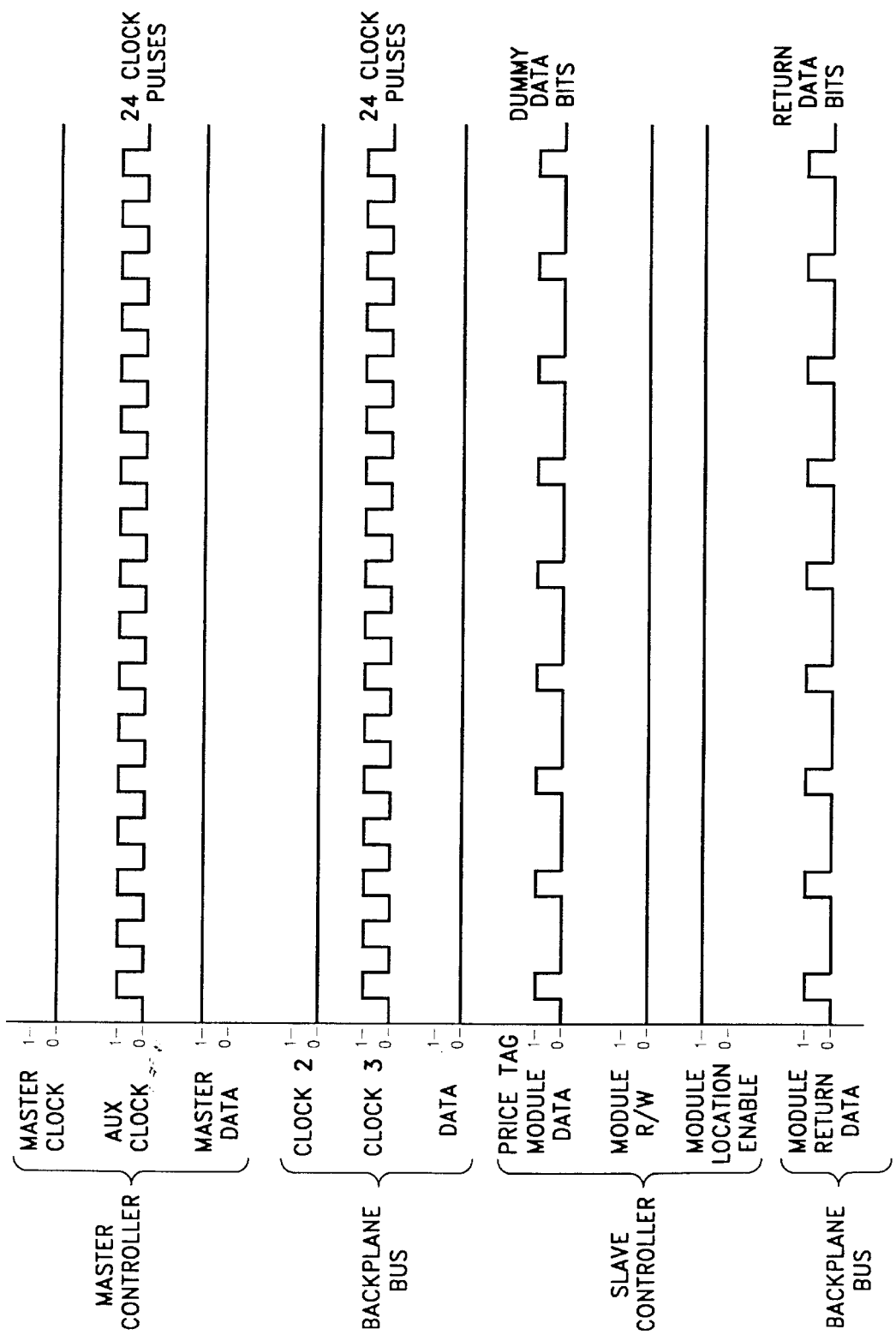
FIG. 8 is a signal timing diagram including connections relating to the master controller, back plane bus, and slave controller when data is read back from the price tag module.

Referring to FIG. 8, the timing diagram shows the states necessary for commanding a return or retrieval of data from the price tag module 61. The auxiliary clock outputs a twenty-four pulse train which travels through the back plane bus. A series of dummy data bits (typically all 1's) are sent to the price tag module 61. The module read/write line is not enabled, leaving the read/write line at a "low" state. This "low" state enables the inverting amplifier 173 on FIG. 4 to output a "high" signal to enable the operation of AND gate 175. Referring back to FIG. 4, the dummy data bits will be blocked by the AND gate 171 and will have no useful effect. The clock pulses cause data to be clocked out of the shift registers 181, 183 and 185 as the very same data is clocked back into the same shift registers. As the data is clocked out, it goes through the line driver 187 and back to the CPU 31. Of course, transceivers 37 and 33 have to be configured to handle the reverse flow of data. Currently, packet-type transfer software has been developed which should handle this problem.

In the startup phase of the system of the present invention, a master controller 41 reset signal may be sent from the central CPU 31 to all of the master controllers 41. Each master controller 41 would then reset and waits for information to be sent from the CPU 31. Details of the reset and pre-set circuitry is omitted from this description for clarity and to avoid confusion.

Referring to FIG. 1, and in the case where several master controllers 41 are present, any forward signal from the CPU 31 will reach all master controllers 41, 43, 45 simultaneously. This operation will preferably occur whether or not a radio link transceivers 33 is used with multiple radio link transceivers 37, or whether or not one radio link transceiver 37 is used with multiple numbers of master controllers 41, 43, 45.

Each master controller 41, 43, 45 will receive the signals sent from the CPU 31, but will not act upon the signal or otherwise continue to propagate the signal unless the message is intended for a price tag module 61 controlled by such master controller 41. Once the correct signal is received by a master controller 41, one which the master controller 41 is meant to receive, it is then sent on to a slave controller 41.

However, the signal is sent on at a later time as can be seen by the differences between FIG. 5 and FIG. 6 with regard to the respective timing diagrams. The delay in re-sending a signal to its proper master controller 41, slave controller 51 and price tag module 61 is related to the elimination of the wiring and logic required to have simultaneous recognition of each signal sent out by the central CPU 31.

Were every price tag module 61 to receive every transmission of a signal from the central CPU 31, each signal would have to have an address large enough so that each price tag module 61 would have a broad individual address. A broad individual address would increase the cost and complexity for each of the price tag modules and would make any such electronic price tag system extremely cost prohibitive. By having the logical distribution points in the system receive the data and then test the identity of the data to see whether it should proceed, it eliminates level of routing which would otherwise have to occur further downstream. In other words, by placing the routing address decision farther upstream, address discrimination hardware which would be located downstream is eliminated. Since upstream decision points are lesser in number than decision points farther downstream, the physical elimination of address discrimination hardware in the relatively more numerous decision points downstream results in system simplification.

The process of the invention involves the steps of transmission to the master controller, address compare, further transmission to a slave controller S1, further address compare and physical connection to lines associated with a price tag module 61. Because these steps occur so rapidly in human terms, there is no noticeable reduction in speed from the standpoint of a human interacting with the system. An operator can stand in an aisle and transmit a price change to the central CPU 31 with a radio frequency hand held input device. The central CPU 31 can cause the price to be transmitted to the price tag module 61 so rapidly the an operator would perceive it as instantaneous.

One of the reasons that the system of the present invention is ideally suited for the use with a radio link transceiver 33 is that it facilitates the transmission of the signal to all of the master controllers when each master controller 51 has its own transceiver 37. In deciding whether to use a single transceiver 37 for multiple master controllers or a transceiver 37 for each master controller 43 will depend on the economics of the configuration and the physical limitations of each layout.

Regardless of the particular configuration, the sequence of bits in the signal ideally includes a master controller logical address, a slave controller logical address, and a price tag 61 relative position. Where a wireless link is used, as shown by the transceivers 33 and 37 of FIG. 1, the sequence of bits may include a security code which is programmed for each individual master controller in order to exclude extraneous transmissions from acting upon the price tag system.

The method of handling message traffic from the central CPU 31 is as follows. Once the master controller 41 receives a complete stream of bits, a counter on the master controller 41 flags a transmission completed signal. If the logical address which is pre-programmed for that master controller 41 matches the master controller 41 address sent in the sequence of bits sent from the CPU 31, the selected master controller 41 enables the following communications with a slave controller 51 to occur.

The enabled master controller 41 allows the clock signals to pass from the central CPU, through the wireless link provided by the transceivers 33 and 37, to the slave controllers 51. Once the transmission from the master controller 41 to the slave controllers 51 is completed, each slave controller 51 compares the logical slave address to its own address. Preferably, the slave controller 51 may draw its electrical power directly from its back plane connections.

Each slave controller 51 is preferably pre-programmed with a logical address. Each logical address may be displayed in a hexadecimal format on the front of the individual shelf section where it is located. This address is typically a two character hexadecimal number and may be used by an ordering/inventory employee to identify to the system a specific slave controller 51 on the system. A hand-held RF terminal may prompt the user to input the two digit address of the bar where the price tag is located. The user could also be instructed to input the price tag module 61 position. In this case, the user could then input a new price, product identification, or similar information. The input can be performed from the aisle by the use of the hand-held unit 40 either as a transmitter or transceiver used by the ordering/inventory employee.

Alternatively, the user could initiate a procedure where the aisle number the user is standing in is entered into the hand-held unit 40. The central CPU 31 would then poll all possible locations (logical addresses) which are attached to the master controller 41 which controls the aisle where the user is standing. Thus, when a new price tag module 61 has been added, the central CPU 31 will be able to identify the price tag module 61 by monitoring the return of data sent to the price tag module 61 location.

The central CPU 31 will then display the digits "88.88" to indicate to the user the particular price tag module 61 whose contents are being examined by the central CPU 31. The central CPU will be operating upon the exact address/location of the price tag module 61 obtained during the polling operation. This will eliminate any possibility of selecting the wrong price tag module 61 since there will be a direct indication to the operator of exactly which location is associated with the data being entered for a product.

Next, the user may be prompted for the product information which may be supplied in part by scanning the bar code information of the product to be associated with the new price tag module 61. The central CPU 31 then records the address of the price tag module 61 along with the product identification information such that future price changes can now be sent for that product to its 5 correct address. If the user adds more than one new display module at a time, the central CPU 31 can build a list of new modules found during the polling operation and apply the above method for each one on the list successively.

As an option to the system of the present invention, immediately next to the display could be placed a user-specified label. Such user-specified label could indicate a bar code for the item and/or other product information which the user may want to represent manually. During is initial installation, a hand-held RF unit could be used to "flash" product bar codes and reference to a specific slave controller address and price tag position with a specific product.

Individual price tag modules 61 may be added to the system at any time, up to a maximum amount per slave controller 51 based upon the number of conductors extending from the slave controller 51.

The overall topology of the electronic system of the present invention was designed to incorporate advantages in terms of the physical portions of the hardware layout. A description of the physical requirements will begin with reference to FIG. 9.

Figure 9:
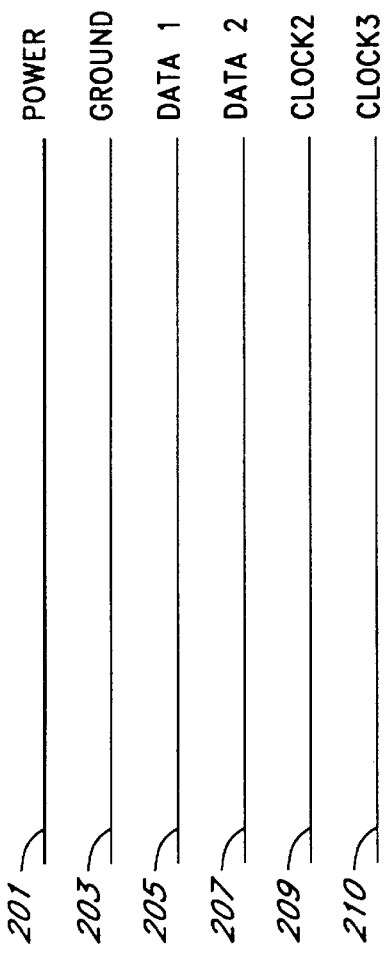
FIG. 9 is a schematic of the signal lines between the master controller and slave bus.

FIG. 9 is a small schematic of the electrical connections which are preferred to extend from the master controller 41 to the slave controller 51. The lines include a power line 201 and a ground line 203. The power line 201 is to supply a 5 volt direct current source of electrical energy with respect to the ground line 203. The other lines are a DATA 1 line 205, a DATA 2 line 207 and a CLOCK 2 line 209 and a CLOCK 3 line 210. Thus, the communication between a master controller 41 and a slave controller 51 requires only 6 lines.

Figure 10:
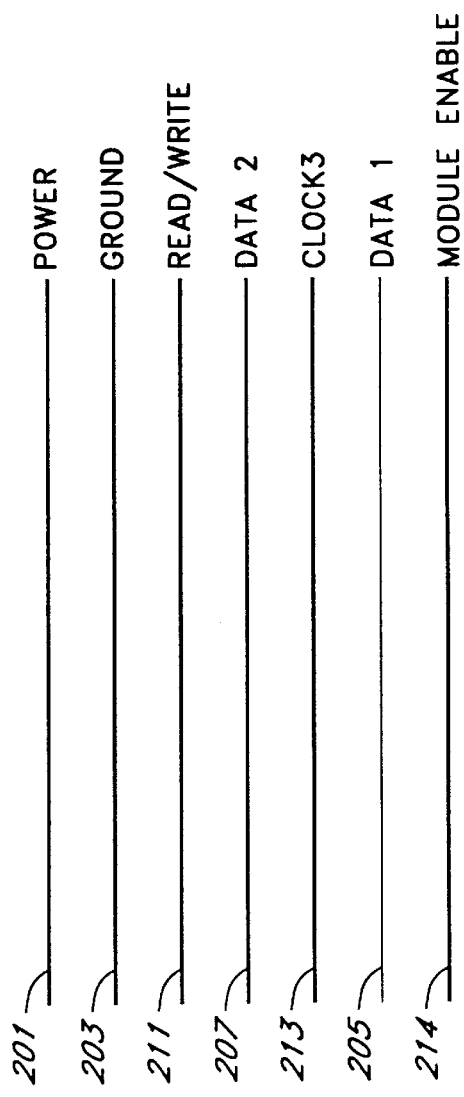
FIG. 10 is a schematic of the signal lines between the slave controller and the price tag bus.

Referring to FIG. 10, a schematic illustration of the communication lines between a slave controller 51 and a price tag module 61 is shown. Conductors which are present in FIG. 10 and which were previously present in FIG. 9 include power line 201, ground line 203, DATA 1 line 205, and DATA 2 line 207.

FIG. 10 illustrates a READ/WRITE enable line 211. In addition there is a CLOCK 3 line 213, a line dedicated to the CLOCK 3 signal, unlike the CLOCK 2/3 line shown in FIG. 9. A module enable line is also presented to each price tag module 61. Thus, the communication between a slave controller 51 and a price tag module 61 requires only 7 lines.

Figure 11:
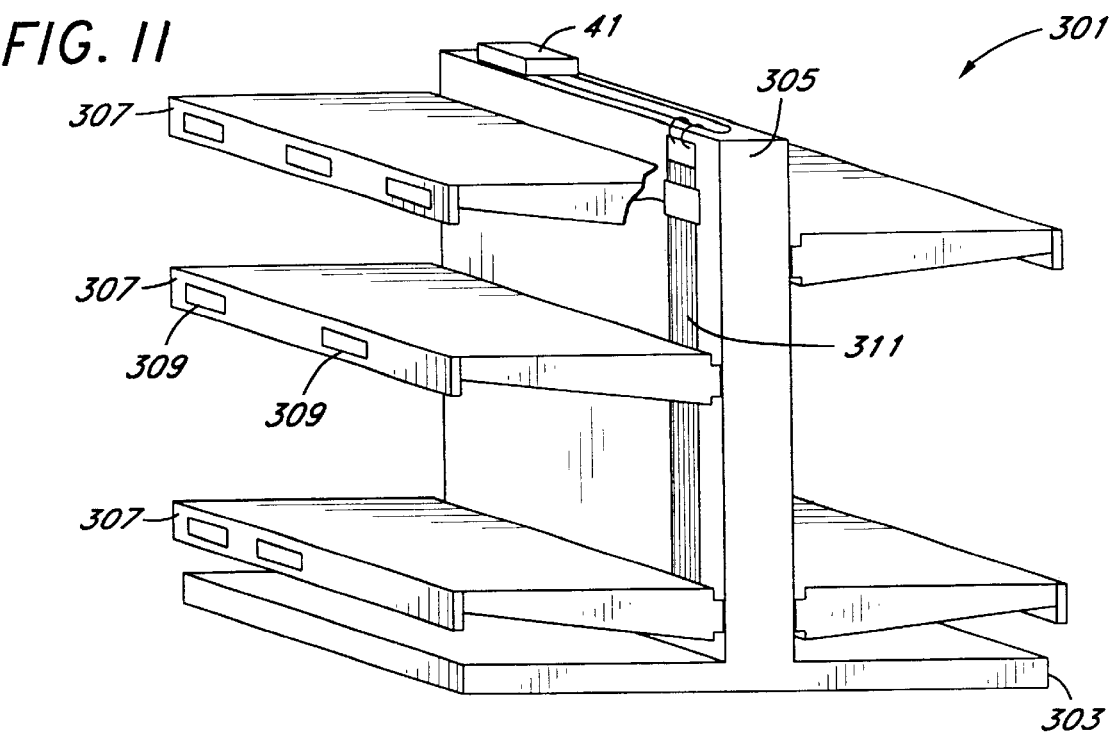
FIG. 11 is a perspective view of a typical gondola which has been modified to support the system of the present invention.

Referring to FIG. 11, an extremely simple perspective view of a shelving system known as a gondola is illustrated. In grocery stores, for example, the shelving system would be significantly higher and the shelves would be much larger and more numerous.

A gondola 301 will probably have an extended base portion 303 for increased stability. In some instances, the extended base portion 303 may be used to provide a fixed bottom shelf.

The gondola 301 has an extended vertical portion 305 which supports a series of shelves 307. The shelves 307 may have rearwardly mounted tabs to fit into slots on the extended vertical portion 305 of the gondola 301.

Each shelf 307 may show a series of price tag display windows 309. Running vertically along the extended vertical portion 305 of the gondola 301 is a specialized bus 311 which lies behind the shelf 307 when shelf 307 is locked into place on the extended vertical portion 305 of the gondola 301.

Where a shelf 307 is long enough and requires enough price tag modules 61 and price tag displays 309, each shelf may support its own slave controller. Since there is a common bus arrangement between the master controller 41 and the slave controllers 51, a configuration which enables shelves to depend from a common bus 311 structure is favored. Such a configuration reduces independent wiring which might otherwise be necessary.

In this configuration, a gondola 301 could support a relatively large number of shelves 307 without the need for additional wiring. Moreover, where it is necessary to change the number of shelves 307 in a display space, such change can be accomplished rapidly and without the need for additional wiring. All that need be done is to remove or add shelves 307.

Referring again to FIG. 11, and assuming that the gondola 11 shown is not an end gondola, the box-shaped object shown mounted atop gondola 301 would be the master controller 41. The slave controllers 51 would be mounted underneath the shelves 307 and preferably out of sight.

Figure 12:
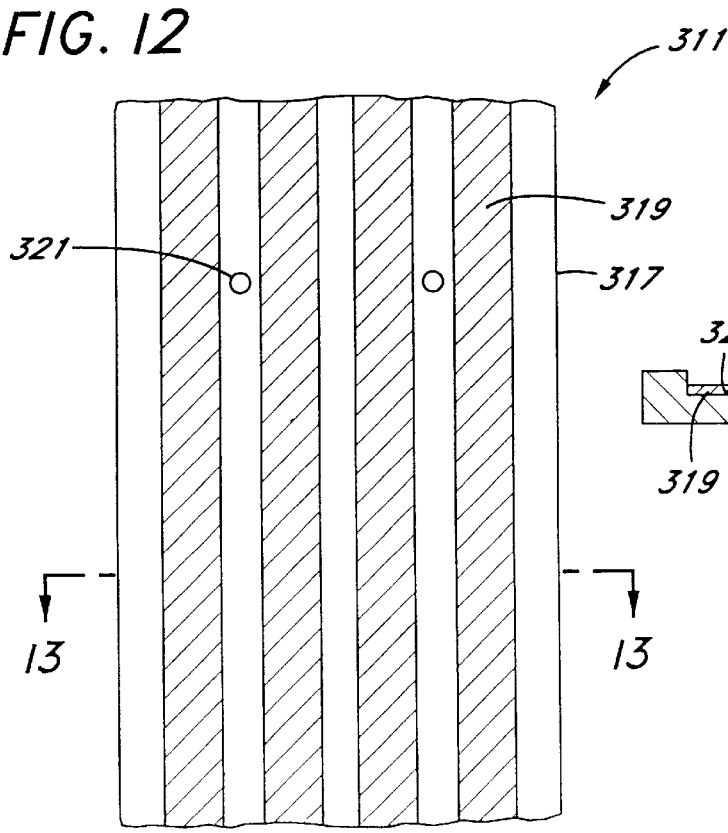
FIG. 12 is a plan view of the physical structure the specialized bus shown in FIG. 11.

Referring to FIG. 12, the specialized bus 311 is shown as being a rigid bus support base supporting a series of vertically extending metallic strips 319. The metallic strips 319 are recessed with respect to the forward most surface of the specialized bus 311.

Figure 13:
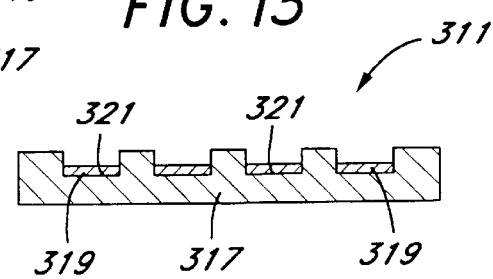
FIG. 13 is a cross sectional view of the specialized bus of FIG. 12 taken along line 13—13.

This is best illustrated in FIG. 13. This cross sectional view of the specialized bus 311 illustrates the conductor strips 319 as being recessed within slots 321. Since the thickness of the conductor strips 319 is less than the depth of the slots 321, the strips 319 are effectively recessed within the bus support base 317. It is further understood that the bus support base 317 can be made in a thin profile much thinner than the view shown in FIG. 13.

Structures at the back portion of the shelf 307, will have projections properly spaced to engage the metal strips carried by the bus support base 317. Also shown are mounting holes 321 in the bus support base 317 which enable it to be mounted to the vertical portion 305 of the gondola 301. Although only four electrical conductor strips 319 are shown, the number of electrical conductor strips 319 can vary depending upon the requirements of the particular electronic price tag system.

The portions of the bus support base 317 which extends between the metal conductor strips 319 act as a bearing surface with regard to any objects placed against the bus support base 317 and which lack the proper structure to reach through to the conductor strips 319.

Figure 14:
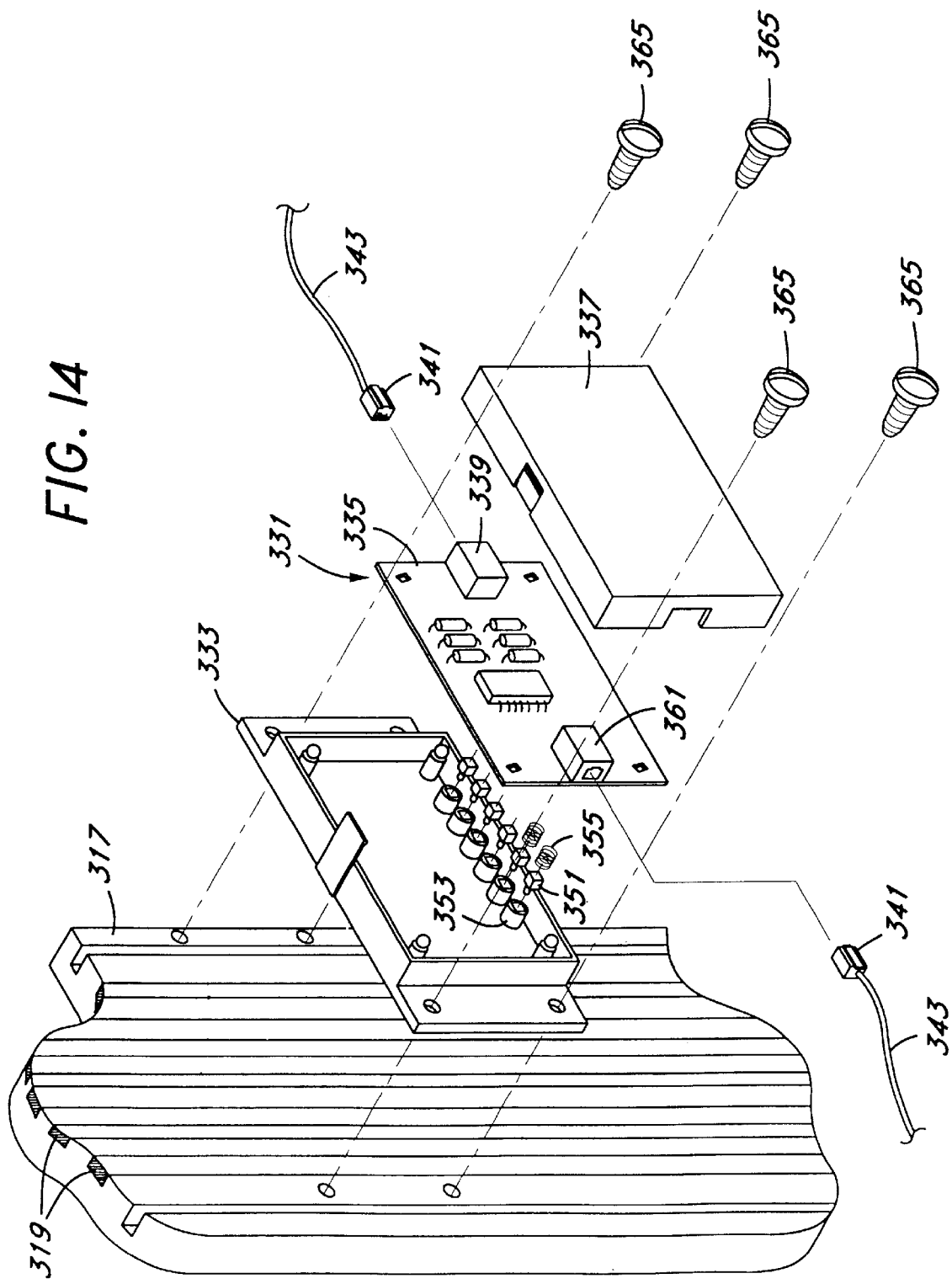
FIG. 14 is a plan view of a preferred interconnect unit to facilitate communication between the specialized bus of FIGS. 11–13 and the master controller.

The structure which provides electrical contact to the specialized bus 311, and especially when the bus support base 317 is used, is shown in FIG. 14. An interconnect unit 331 includes a rear housing 333, a circuit board 335 and a cover 337 which is securable to the rear housing 333 to enclose and secure the circuit board 335. The interconnect unit 331 may be placed arbitrarily at any point along the bus, especially the bus support base 317.

The interconnect 331 can be of several types. First, the bus support base 317 must have an entry point for the supply of signals to be provided along its vertical extent. The input of signals onto the specialized bus 311 can be accomplished by an interconnect 331 configured only as a connector. Secondly, signals will need to be received from the specialized bus 311, and the interconnect 331 can -again be used for this purpose. Further, where the overall topology facilitates a slave controller 51 where signals are to be taken from the specialized bus 311, the slave controller can be built into the interconnect 331. In this event, the signals to be taken from the interconnect 331 should be configured to lead directly to the price tag modules 61. Where the interconnect 331 is used to distribute the signals to the specialized bus 311, connections to and from the interconnect 331 can be used to provide a source in input signals.

The circuit board 335 contains a modular connector 339 which may, range from a telephone-type jack to a specialty connector as required by the system. As is shown, the modular connector 339 is interconnectably engagable with male modular connector 341 attached to the end of a telephone type line or wire bundle 343. Again, bundle 343 can be used to supply signals to the interconnect 331, or it can be used to distribute signals from the interconnect 331. Where the interconnect 331 is configured to include circuitry of the slave controller 51, the connector 341 and modular connector 339 can be used to distribute signals to the price tag modules.

The rear side of the circuit board 335 has conductors which will engage a series of spring loaded contact sets within rear housing 333. The contact set operates with a small cylindrical contact 351 which is axially slidable within a boss 353 formed with the rear housing 333. The end of the bore of each boss at the back side of the rear housing 333 should have a reduced diameter section to prevent the cylindrical contact 351 from exiting the back of the rear housing.

Each cylindrical contact 351 is urgably engaged by a spring 355. When circuit board 335 is pressed into place on the rear housing 333, the springs 355 make contact with conductors on the rear side of the circuit board 335. Once the circuit board 335 is secured with respect to the rear housing 333, the small ends of the cylindrical contacts 351 will then be spring loaded. The circuit board 335 can be independently secured with respect to the housing 333, although the force used to keep the cover 337 in place will further secure the circuit board 335. Alternate springy contact configurations may be utilized.

Circuit board 335 has a second modular connector 361 at an end opposite the modular connector 339. This arrangement is especially advantageous where the slave controller 51 circuitry is incorporated in the interconnect unit 331. Note that in FIG. 1, the slave controllers 51 are connected in parallel along a common bus line. Where the slave controller circuitry 51 is incorporated into the circuit board 331, the use of pairs of modular connectors 339 and 361 will facilitate the "chaining" of the slave controllers 51.

In instances where the slave controller is to be located elsewhere, the circuit board 335 can be used merely to make the physical connections and to provide a support to spring load the cylindrical contacts 351, or to provide driver circuitry for signal repeater capability.

As is further shown, a set of four screws 365 are used to secure the rear housing 333 to the bus support base 317. Note that the interconnect 331 can be secured at any height to the bus support base 317. Where the interconnect 331 is to be mounted just underneath a shelf 307, the interconnect can be removed and reattached to a more advantageous height on the bus support base 317.

Figure 15:
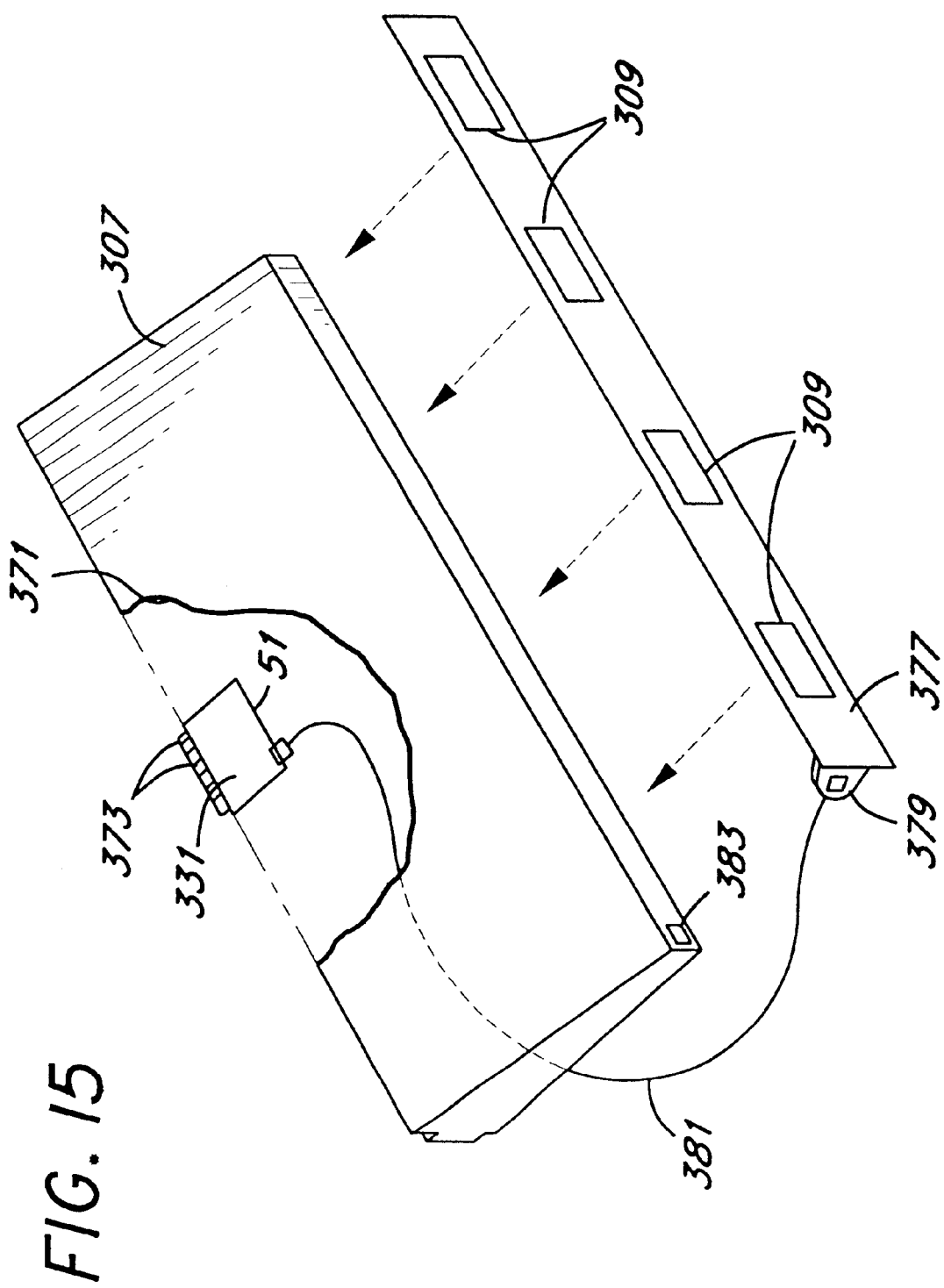
FIG. 15 is a perspective view of a shelf with a series of price tag modules connected along a front edge.

Referring to FIG. 15, an exploded view illustrates an interconnect unit 331 shown within the limits of a broken-away portion 371 of the shelf 307. In this instance, the interconnect 331 is configured to be a slave controller 51. In this case, signals are obtained from the specialized bus 311 through a set of ends 373 of the cylindrical contacts 351.

The interconnect 331 is connected to an extended length strip 377 which contains a plurality of price tag display windows 309 which were seen in FIG. 11. As is shown, the strip 377 has a modular connector 379 which may be identical to the modular connectors 339 and 361 which were previously shown in FIG. 14. A wire connection 381 connects the slave controller 51 within the interconnect unit 331 to the extended length strip 377.

The strip 377 is intended to be affixed to the shelf 307. The ability to affix the strip 377 to already existing shelves 307 will enable the price tag system of the present invention to be retro-fitted to existing shelving. Thus the price tag system installation will be facilitated by the physical structures shown in FIGS. 15 and 16. The interconnect unit 331 can be added to take support from the shelf 307 or directly from the bus support base 317 of FIG. 14. As such, the interconnect unit 331 can be made to fit closely under the shelf 307 at the time of its installation. This close fit will result in maximum clearance under the shelf 307 to prevent taking up any space which would otherwise be utilized for the storage of goods on a shelf 307 underlying a shelf 307 where an interconnect unit 331 was located occupying the next level down.

Further, where the interconnect unit 331 is permanently attached to a shelf, the act of installing the shelf at any level automatically provides contact with the bus support base 317. As such, the modularization of the shelving system is increased, minimizing any special attention which must be given to the electrical and electronic system portion of the invention.

Having a modular connector 379 extending rearwardly of the strip 377 enables the connection to be made either at the end of the shelf 307, or through an aperture 383 cut into the face of the shelf 307. Where. the shelves 307 are closely fitting with little or no clearance between adjacent shelves, the aperture 383 may become a practical necessity. Otherwise, a wire may be exposed between the shelves 307 which could invite tampering or accidental damage.

Figure 16:
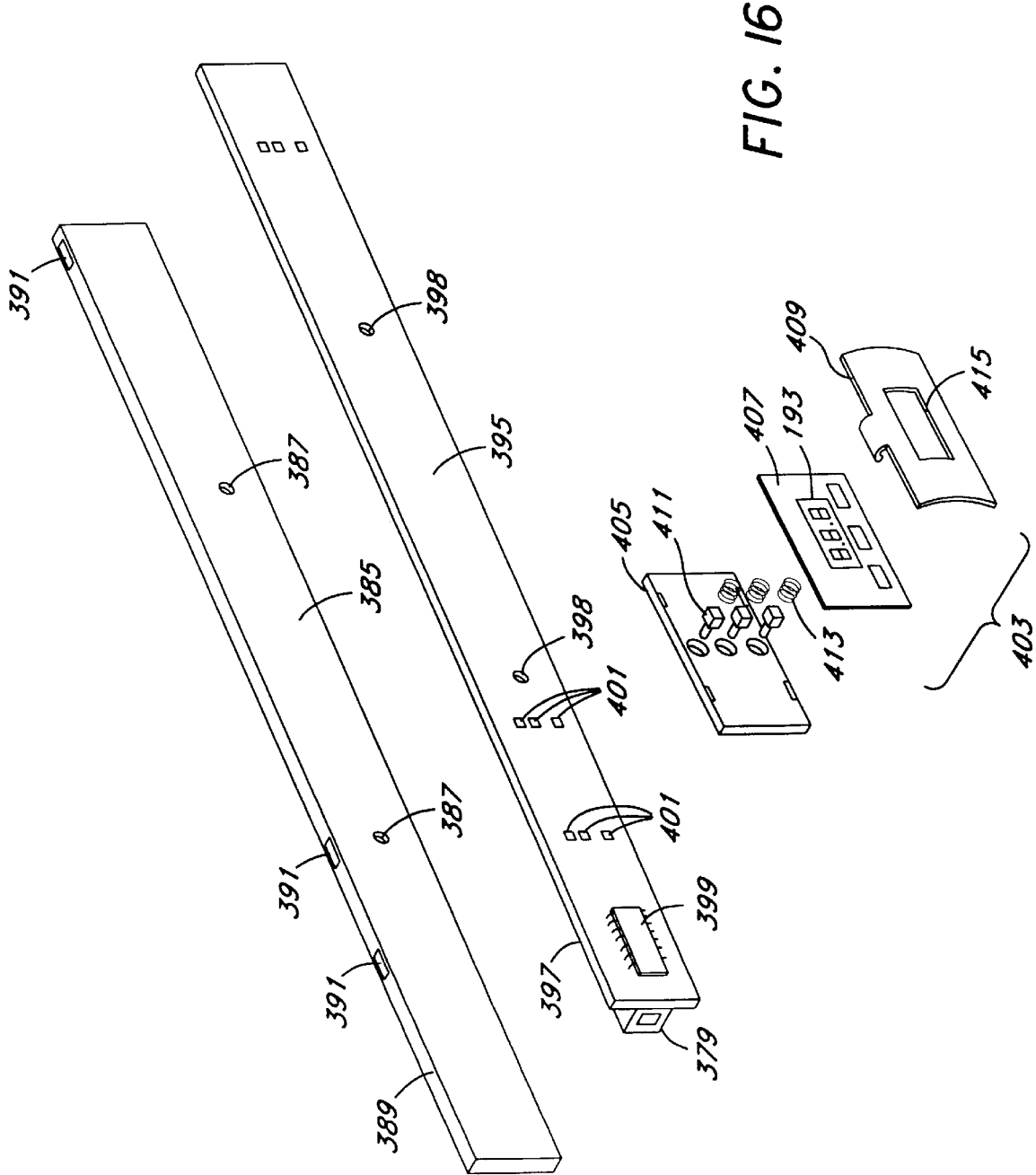
FIG. 16 is an exploded view of the length of price tag modules of FIG. 15.

Referring to FIG. 16, an exploded view of the strip 377 is illustrated. The price tag strip 377 has a back housing 385 which may have a series of mounting holes 387 or any other structures to facilitate the engagement of the strip 377 to a shelf 307 which was shown in FIG. 15.

The back housing 385 has an upper edge 389 which defines a series of bezels slots 391 to facilitate connection by a carrier 395. As is shown, the carrier 395 has holes 398 which may engage the shelf 307 through the holes 387 of the back housing 385. The carrier 395 will preferably be constructed of materials which will synergize with the circuit requirements of the price tag modules 61. For example, the carrier 395 may be made of printed circuit board material. The use of printed circuit board material enables the carrier 395 to support conductors, connectors, and electronic components directly.

As is shown, immediately adjacent the modular connector 379 is a chip 399 which represents one of many possible locations for the chips shown in FIG. 3. Adjacent the chip 399 is a series of metalized surfaces 401. These surfaces are placed at discrete distances along the carrier 395.

In front of the metalized surfaces 401 is a removable and moveable price tag 403 including a tag base 405, tag printed circuit board 407 and tag bezel 409. The moveable price tag 403 may contain a part or all of the circuitry associated with the price tag module 61 shown in FIG. 1. The tab base 405 has a series of contact pins 411 and springs 413 to insure that the contact pins 411 will make electrical contact with the metalized surfaces 401. The tag printed circuit board 407 makes contact with the springs 413 to complete the contact with the carrier 395. Alternate springy metal contact arrangements may be utilized.

The bezel 409 is a cover for the individual price tag 403 and contains a rectangular window 415. The edges of the bezel 409 can engage the bezel portions 391 of the back housing 385. When the carrier 395 is otherwise firmly connected to the back housing 385, the bezel 409 is used to hold the printed circuit board 407 and base 405 against the carrier 395. The assembled price tag 403 has an upper edge which is intended to engage the back housing 385, using holes 391.

With this configuration, an individual price tag 403 can be removed. This is important for several reasons. Even though the price tag module 61 is hard wired, and the location of the metalized surfaces 401 will still represent a hard wired location, the loss of a hard wired location may be necessary where a larger space is needed to store one type of item.

Further, sacrifice of a tag module location or hard wire address, where a price tag 403 is to be moved, is even further desirable given the logical result that the displacement of one tag 403 would make necessary the rearrangement of the other electronic tags 403.

However, with the system of the present invention, the price tag 403 can be snapped off in one motion and snapped on in one motion. No tool more complicated than a flat head screwdriver would be necessary to remove the tag 403. Special attachment structures for more secure connection may be present where theft of the tags 403 or vandalism is a significant concern. The physical removal of the tags 403 can be performed by an attendant as he carries the hand-held unit 40 and strolls the aisles setting up and taking down product displays.

The metalized surfaces 401 are shown as having an exaggerated area for illustration purposes. In reality, these surfaces can have abbreviated area and be accessible only to the sharp ends of the contacts 411 if the tag 403 is so constructed. In most applications, vandalism will not be a problem, and even customers who may be moderately destructive cannot harm the price tag system of the present invention.

While the present invention has been described in terms of an electronic price tag system, one skilled in the art will realize that the structure and techniques of the present invention can be applied to many appliances. The present invention may be applied in any situation where units of a distributive information system need to exist at the lowest possible cost with minimum communication lines, and with the ability to physically add and delete information carrying modules.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. An electronic price tag system comprising:
   a plurality of address-free price tag modules having means to store and display price information but no means to either store or decode address information;
   central computing means for transmitting an information signal;
   a plurality of signal routing means, each having a unique address and being connected between said central computing means and said plurality of address-free price tag modules to receive said information signal transmitted by said central computing means, said information signal containing data corresponding to the address of a particular one of said plurality of signal routing means, the location of a particular one of said plurality of price tag modules, and the price information to be stored and displayed by said particular price tag module, said plurality of signal routing means comparing the respective unique addresses thereof with the address data contained by said information signal transmitted by said central computing means;
   a plurality of enable lines that are electrically distinguishable from one another, said plurality of signal routing means connected to said plurality of price tag modules by respective ones of said enable lines; and
   a plurality of data bus lines each of said data bus lines respectively connected between one of said plurality of signal routing means and a number of said plurality of address-free price tag modules;
   a selected one of said plurality of signal routing means whose unique address matches the address identified by said information signal generating first and second output signals, a first of said output signals enabling the particular one of said plurality of price tag modules via a respective one of said electrically distinguishable enable lines depending upon the location identified by said information signal, and the second output signal being transmitted on one of said plurality of data bus lines to each of said number of price tag modules that are connected to said one data bus line so that the price information can be stored and displayed by said particular price tag module that is enabled via the respective one of said electrically distinguishable enable lines.

2. The electronic price tag system recited in claim 1, further comprising circuit means by which said plurality of address-free price tag modules communicates with said central computing means so that the price information stored by said plurality of price tag modules can be supplied to said central computing means.

3. The electronic price tag system recited in claim 2, wherein the selected one of said plurality of signal routing means generates a third output signal to the particular one of said plurality of address-free price tag modules to condition said particular price tag module to either receive price information from said central computing means or to supply price information to said central computing means.

4. The electronic price tag system recited in claim 1, further comprising:
   a first radio link transceiver connected to said central computing means; and
   a second radio link transceiver connected to said plurality of signal routing means and communicating with said first radio link transceiver.

5. The electronic price tag system recited in claim 1, wherein said plurality of signal routing means includes a first plurality of master controllers and a second plurality of slave controllers, each of said first plurality of master controllers connected to some of said second plurality of slave controllers, and each of said second plurality of slave controllers connected to some of said plurality of address-free price tag modules via respective ones of said electrically distinguishable enable lines.

6. The electronic price tag system recited in claim 5, further comprising a power line, a ground line, first and second data lines, and first and second clock lines to connect said first plurality of master controllers to said second plurality of slave controller.

7. The electronic price tag system recited in claim 6, wherein said second plurality of slave controllers is interconnected with said plurality of address-free price tag modules by no more than said power line, said ground line, said first and second data lines, one of said first and second clock lines, one of said enable lines over which the particular one of said plurality of price tag modules is enabled, and a read/write line by which to cause said plurality of price tag modules to supply the respective price information stored therein to said central computing means via said first data line.

8. The electronic price tag system recited in claim 5, wherein each of said plurality of address-free price tag modules includes a plurality of shift registers connected in electrical series with one another, each of said plurality of shift registers having a data input, a data output and a display output, the display outputs of said plurality of shift registers connected to a display circuit, and the data output of the last of said plurality of shift registers connected to the data input of the first of said plurality of shift registers.

9. The electronic price tag system recited in claim 8, further comprising first switch means connected between the data output of the last shift register of said plurality of series connected shift registers and the data input of said first shift register of said plurality of series connected shift registers to control the transmission of data therebetween, one of said plurality of slave controllers connected to said first switch means to control the operation thereof.

10. The electronic price tag system recited in claim 9, further comprising second switch means connected between the one of said plurality of slave controllers and the data input of said first shift register of said plurality of series connected shift registers to control the operation of the price tag module in which said plurality of series connected shift registers are included.

11. An electronic price tag system comprising:
   a plurality of price tag modules having means to store and display price information;
   central computing means for transmitting an information signal indicating a particular one of said plurality of price tag modules to be enabled and the price information to be stored and displayed thereby; and
   a plurality of signal routing means, said central computing means supplying said information signal to said plurality of signal routing means to cause a particular one of said signal routing means to supply the price information of said information signal to the particular one of said price tag modules indicated by said information signal;
   each of said plurality of price tag modules including a plurality of shift registers connected in electrical series with one another, each of said plurality of series connected shift registers having a data input, a data output, and a display output, the display outputs of said plurality of series connected shift registers connected to a display circuit, and the data output of the last shift register of said plurality of series connected shift registers connected to the data input of the first shift register of said plurality of shift registers.

12. The electronic price tag module recited in claim 11, wherein the data outputs of the last of said plurality of series connected shift registers of each of said plurality of price tag modules are connected to said central computing means to allow communication therebetween.

13. The electronic price tag system recited in claim 11, wherein each of said plurality of price tag modules is address-free.

14. The electronic price tag system recited in claim 11, wherein said plurality of signal routing means includes a first plurality of master controllers and a second plurality of slave controllers, each of said first plurality of master controllers connected to some of said second plurality of slave controllers, and each of said second plurality of slave controllers connected to some of said plurality of price tag modules.

15. The electronic price tag system recited in claim 14, further comprising first switch means connected between the data output of said last shift register of said plurality of series connected shift registers and the data input of said first shift register of said plurality of series connected shift registers to control the transmission of data therebetween, one of said plurality of slave controllers connected to said first switch means to control the operation thereof.

16. The electronic price tag system recited in claim 15, further comprising second switch means connected between the one of said plurality of slave controllers and the data input of said first shift register of said plurality of series connected shift registers to control the operation of the price tag module in which said plurality of series connected shift registers are included.

17. A modular electronic price tag system comprising:
   a gondola having a vertical support;
   a plurality of shelves detachably connected to said vertical support so as to depend outwardly therefrom;
   central computing means for transmitting an information signal containing price information;
   a plurality of price tag modules to display the price information contained by the information signal transmitted by said central computing means;
   a carrier strip having a set of electrical contacts and connected to one of said plurality of shelves;
   retaining means by which to detachably connect said plurality of price tag modules to said carrier strip so that said price tag modules are electrically connected to the set of electrical contacts of said carrier strip, said retaining means including a set of catch holes formed in said carrier strip and a plurality of covers to enclose respective ones of said plurality of price tag modules, said plurality of covers being removably attached to said carrier strip at said set of catch holes to hold said plurality of price tag modules in electrical connection with said set of electrical contacts of said carrier strip;

signal routing means mounted on the one of said plurality of shelves to supply the information signal transmitted by said central computing means to a particular one of said plurality of price tag modules via the set of electrical contacts of said carrier strip; and an information signal bus running along the vertical support of said gondola for electrically connecting said plurality of price tag modules that are detachably connected to said carrier strip to said central computing means when the one of said plurality of shelves is detachably connected to said vertical support and said signal routing means is connected to said information signal bus.

18. The modular electronic price tag system recited in claim 17, wherein said information signal bus includes a bus support, a series of recessed channels formed in said bus support, and a corresponding series of electrically conductive strips located in respective ones of said series of recessed channels, the said one of said plurality of shelves engaging said series of electrically conductive strips for connecting said plurality of price tag modules to said central computing means when said one shelf is detachably connected to the vertical support of said gondola.

19. The modular electronic price tag system recited in claim 17, wherein said signal routing means includes a printed circuit board having a series of conductive areas, a set of electrical contacts to connect the respective conductive areas of said circuit board to said information signal bus, and a housing for supporting said circuit board against said information signal bus, said housing having a plurality of openings to accommodate respective ones of said contacts therethrough.

20. The modular electronic price tag system recited in claim 17, wherein said carrier strip has a first modular connector in electrical communication with said plurality of price tag modules and said signal routing means has a second modular connector, said first and second modular connectors being interconnected with one another to enable said signal routing means to supply the information signal transmitted by said central computing means to the particular one of said price tag modules.

\* \* \* \* \*